May 25, 1965  M. B. LITZ  3,185,758
INSULATED PIPE HANGER
Filed March 5, 1962
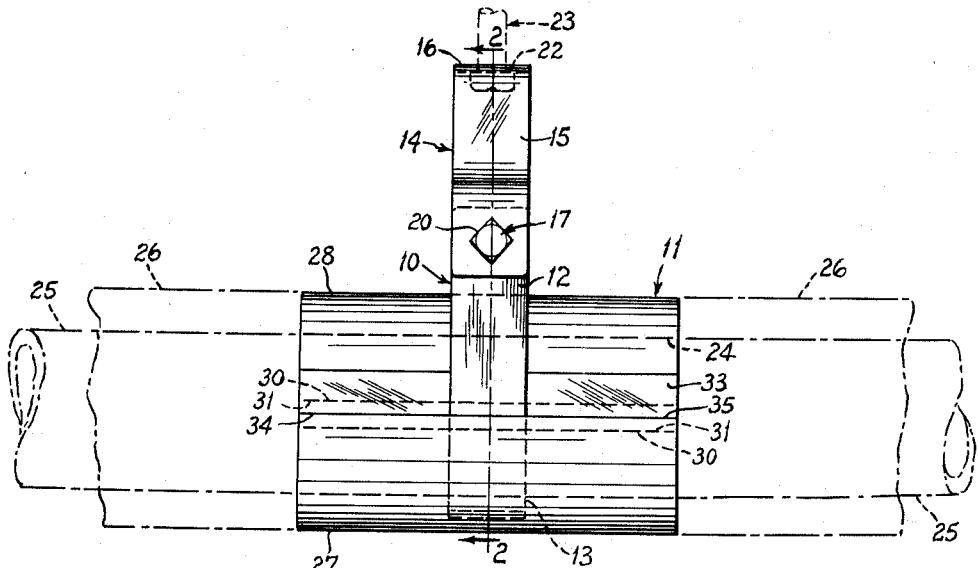
FIG. 1.
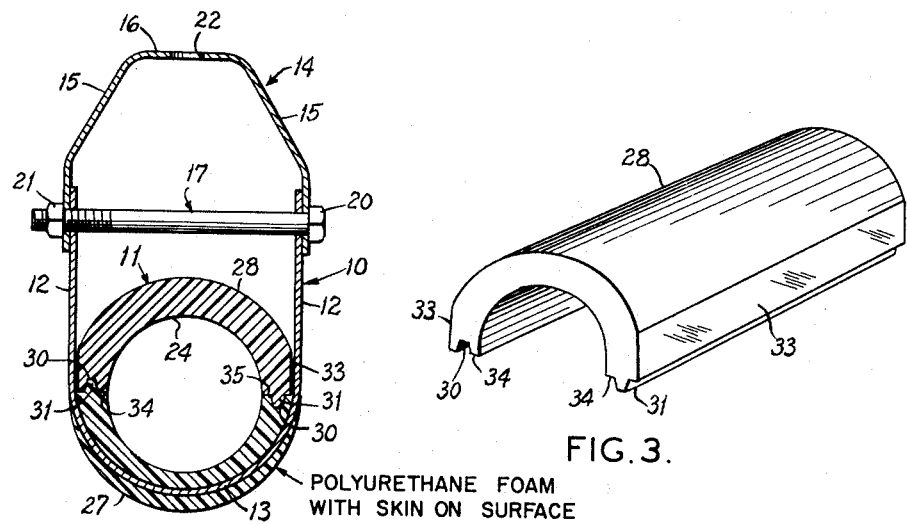
FIG. 2.
FIG. 3.
POLYURETHANE FOAM WITH SKIN ON SURFACE
INVENTOR
MILTON B. LITZ
BY *Cohn and Powell*
ATTORNEYS United States Patent Office 3,185,758
Patented May 25, 1965

3,185,758
INSULATED PIPE HANGER
Milton B. Litz, 639 Langton Drive, St. Louis, Mo.
Filed Mar. 5, 1962, Ser. No. 177,309
3 Claims. (Cl. 174—40)

This invention relates generally to improvements in an insulated pipe hanger, and more particularly to an improved device of this type adapted to retain a pipe and yet insulate it from the conductive elements of the holder and from all other objects in the immediate vicinity.

It is an important object to provide a hanger that is constructed to be readily fixed in any desired pre-determined position to support a span or length of pipe, the hanger being connectable to a ceiling, beam, rafter or other convenient structure.

Pipes carrying a flow of heat or cold are preferably insulated to maintain the temperature of the flow and to protect the surrounding objects from possible damage. For example, steam and hot water pipes must be completely insulated to afford the most advantageous and efficient transmission system.

An important object is achieved by the provision of a hanger that not only supports a pipe span but also insulates that portion of the pipe engaged by the hanger.

Another important object is realized by constructing the hanger of a tubular insulating member adapted to embrace the pipe, the insulating member including a pair of mating sections detachably connected together, and means embedded in one of these sections in insulative relation to the pipe yet extending outwardly of its associated section for attachment to the supporting structure.

Other important advantages are obtained by constructing the tubular insulating member of a rigid polyurethane foam having a hard skin or outer surface. The rigid polyurethane foam can be varied as to thickness and density to compensate for heavier load factor of larger pipes. Further, the rigid foam structural support is of an approximate 95% closed cell characteristic that cooperates with the skin to provide low vapor transmission and low water absorption.

Another important object is achieved by the provision of a substantially U-shaped strap that is attached to one section of the tubular insulating member, the other section being disposed within the strap and connected to the first-mentioned section, thereby affording a compact unit having great strength.

Still another important object is realized by providing a tongue and groove connection at the abutting side margins of the mating sections comprising the tubular insulating member in order that the sections can be quickly and easily assembled by slidably inserting the separable section into the U-shaped strap from either end and into operative connection with the section fixed to the strap.

Another important object is afforded in the structural arrangement wherein the web of the U-shaped strap is embedded in the interior of one insulating section, and the arms are extended outwardly to receive the other section. Specifically, the arms extend laterally outwardly of the tongue and groove connections on the side margins. Importantly, the strap is electrically insulated from the pipe.

Yet another important object is to provide an insulated pipe hanger that is simple and durable in construction, economical to manufacture, highly efficient in operation, and which can be readily installed by any one with little or no instruction.

The foregoing and numerous other objects and advantages of the invention will more clearly appear from the following detailed description of a preferred embodiment, particularly when considered in connection with the accompanying drawing, in which:

FIG. 1 is a side elevational view of the pipe hanger, and illustrating the environment of the hanger with its associated pipe;

FIG. 2 is a cross-sectional view as seen along line 2—2 of FIG. 1, and

FIG. 3 is a perspective view of the top section of the tubular insulating member.

Referring now by characters of reference to the drawing and first to FIGS. 1 and 2, it is seen that the pipe hanger consists generally of a strap 10 and a tubular insulating member 11.

The strap 10 is substantially of U-shape having laterally spaced arms 12 interconnected by an integral web 13. Attached to the upper free ends of arms 12 is an inverted substantially U-shaped bracket 14 having laterally spaced arms 15 and integral substantially horizontal web 16. The free ends of bracket arms 15 overlap the free ends of strap arms 12, the arms 12 and 15 being interconnected by a transverse bolt 17. As is usual, the bolt 17 includes an integral head 20 engaging the bracket arm 15 at one side, and includes a threadedly attached nut 21 engaging the bracket arm 15 at the opposite side.

The bracket web 16 is provided with a hole 22 through which extends a fastening means generally indicated at 23 as by broken lines in FIG. 1 for attaching the pipe hanger to a ceiling, beam, rafter or other supporting structure.

The tubular insulating member 11 is generally cylindrical in peripheral configuration having a substantially round axial bore 24. As will best appear from FIG. 1, a span or length of pipe 25 indicated by broken lines in FIG. 1 is adapted to be received in the bore 24 and be supported by the pipe hanger. The tubular member constitutes an insulation for that portion of the pipe 25 engaged thereby. The remaining portion of the pipe 25 is wrapped or otherwise provided with additional insulative material 26 to provide a completely insulated pipe assembly.

The tubular insulating member 11 is constructed of a rigid polyurethane foam plastic material having a relatively hard skin or surface. This particular material is extremely lightweight, yet affords extremely effective insulative qualities, and provides a cover for any other insulating structural material.

The tubular insulating member 11 includes a pair of mating half sections 27 and 28 separated along a substantially horizontal plane passed through the bore axis.

Embedded in the interior of the lower upwardly concave section 27 is the web 13 of strap 10. Preferably, the strap web 13 is embedded at the time that the lower section 27 is molded. The strap arms 12 emerge from the lower section 27 at the upwardly facing side margins 35. The downwardly concave top section 28 is located between the strap arms 12 and disposed in overlying relation to the lower section 27. The side margins 34 and 35 respectively of the mating sections 27 and 28 abut to provide a completely enclosed insulating member 11. It will be noted that the sides 33 of the top section 28 are flattened or reduced for their entire length to permit the section 28 to slide easily between the strap arms 12 from either end.

One side margin 34 or 35 respectively of each section 27 or 28 is provided with a longitudinal groove 30, while the other side margin is provided with a compatible, longitudinal tongue 31. When the sections 27 and 28 are assembled, the tongue 31 of each section interfits the conforming groove 30 of the other section. The tongue and groove connection between the sections 27 and 28 enable the sections to be fastened together as the top section 28 is slid between the strap arms 12, the tongues 31 sliding along their associated grooves 30. Of course, the tongue and groove connection 30–31 is located inwardly of the strap arms 12.

The assembly and functional advantages of the pipe hanger are thought to have become fully apparent from the foregoing detailed description of parts, but for completeness of disclosure the usage of the pipe hanger will be briefly described.

First, it will be assumed that the lower insulating section 27 is molded onto the strap web 13 such that the strap is completely insulated from any object engaging such section, and such that the strap arms 12 emerge from the upwardly facing side margins at zones located outwardly from the tongue and groove connections 30–31.

The bracket 14 is attached to the strap 12 by the transverse bolt 17, and the bracket 14 is secured to a suitable supporting structure such as a ceiling by the use of a fastening means 23 inserted through the bracket web hole 22.

After the strap 22 is secured in its desired predetermined position, the span of pipe 25 is located between the strap arms 12 and seated in the upwardly concave section 27. Then, the downwardly concave top section 28 is slipped between the strap arms 12 from either end of the hanger and disposed over the pipe 25. Automatically, the tongues 31 interfit into their associated grooves 30 to secure the sections 27 and 28 together. It will be noted that the portion of pipe actually engaging the sections 27 and 28 is completely insulated from all other component parts of the hanger such as the strap 10 and bracket 14.

The portions of the pipe 25 extending outwardly from each end of the insulating member 11 are wrapped or otherwise provided with a protective sleeve 26 of insulative material. Thus, it is seen that the pipe 25 is completely insulated.

Although the invention has been described by making detailed reference to a single preferred embodiment, such detail is to be understood in an instructive, rather than in any restrictive sense, many variants being possible with the scope of the claims hereunto appended.

I claim as my invention:

1. A pipe hanger comprising:
   (a) a substantially U-shaped strap, and
   (b) an insulating member adapted to embrace a pipe, the insulating member including a pair of mating sections, one of said sections being attached to said strap, and the other of said sections being reduced along its sides at least from one of its ends to enable insertion within said U-shaped strap and detachably connected to said one section.

2. A pipe hanger comprising:
   (a) a substantially U-shaped strap, and
   (b) a tubular insulating member adapted to embrace a pipe, the insulating member including a pair of mating sections having abutting side margins, the side margins having interfitting grooves and tongues detachably connecting the sections,
   (c) the strap being embedded in one of said sections, the other section being disposed within said U-shaped strap, said other section being provided with flattened sides for its entire length so as to slide in from either end of said strap to interconnect the tongues and grooves on the cooperating side margins of the sections.

3. A pipe hanger comprising:
   (a) a substantially U-shaped strap having spaced arms and an interconnecting web,
   (b) means attached to the arms of said strap for fixing the strap in a predetermined position, and
   (c) a tubular insulating member adapted to embrace a pipe, the insulating member including an upwardly concave lower section and a mating downwardly concave top section, the insulating member being of a rigid polyurethane foam of substantially closed cell characteristic having a hard skin,
   (d) said sections having abutting side margins, one side margin of each section being provided with a tongue, and the other side margin being provided with a compatible groove, the tongue of one section interfitting the groove of the other section to connect said sections together detachably,
   (e) the strap web being embedded in said lower section, the strap arms emerging from said lower section outwardly of said groove and tongue on the side margins,
   (f) the top section fitting within the arms of said strap, the top section being reduced at the sides for its entire length to enable insertion into the strap and slidable connection with the lower section from either end.

References Cited by the Examiner

UNITED STATES PATENTS

| | | | |
|---|---|---|---|
| 803,973 | 11/05 | Bemis | 174—155 |
| 1,069,937 | 8/13 | Goehst et al. | 174—155 |
| 2,290,139 | 7/42 | Buchanan | 174—155 X |
| 2,352,145 | 6/44 | Wright | 248—58 |
| 2,714,497 | 8/55 | Denis | 248—62 |
| 3,007,203 | 11/61 | Ammons | 18—48 |

LARAMIE E. ASKIN, *Primary Examiner.*

JOHN P. WILDMAN, *Examiner.*